(12) United States Patent
Yeung

(10) Patent No.: US 10,745,952 B2
(45) Date of Patent: Aug. 18, 2020

(54) INTERLOCKING CONNECTOR AND ASSOCIATED SYSTEMS AND METHODS

(71) Applicant: Sunny Yu Sun Yeung, Toronto (CA)

(72) Inventor: Sunny Yu Sun Yeung, Toronto (CA)

( * ) Notice: Subject to any disclaimer, the term of this patent is extended or adjusted under 35 U.S.C. 154(b) by 568 days.

(21) Appl. No.: 15/660,546

(22) Filed: Jul. 26, 2017

(65) Prior Publication Data

US 2019/0032384 A1   Jan. 31, 2019

(51) Int. Cl.
| *E05D 11/10* | (2006.01) |
| *E05D 5/02* | (2006.01) |
| *F16B 5/00* | (2006.01) |
| *F16B 5/06* | (2006.01) |

(52) U.S. Cl.
CPC ........ *E05D 11/1007* (2013.01); *E05D 5/0215* (2013.01); *F16B 5/0008* (2013.01); *F16B 5/0614* (2013.01)

(58) Field of Classification Search
CPC .... F16B 5/0008; F16B 5/0614; F16B 5/0052; F16B 12/02; F16B 12/20; F16B 12/46; Y10T 403/42; Y10T 403/72; Y10T 403/75; Y10T 403/73
See application file for complete search history.

(56) References Cited

U.S. PATENT DOCUMENTS

| 4,438,578 | A | * | 3/1984 | Logan | A47G 1/101 40/782 |
| 5,893,617 | A | * | 4/1999 | Lee | A47B 47/0041 312/263 |
| 6,200,062 | B1 | * | 3/2001 | You | F16B 12/20 403/381 |
| 6,474,901 | B1 | * | 11/2002 | Thurston | F16B 12/50 403/381 |
| 2012/0321378 | A1 | * | 12/2012 | Velez, Jr. | F16B 12/20 403/300 |
| 2016/0265218 | A1 | * | 9/2016 | Gosling | E04B 2/721 |

* cited by examiner

*Primary Examiner* — Daniel J Wiley
(74) *Attorney, Agent, or Firm* — Davis, Brown, Koehn, Shors & Roberts, P.C.; Matthew Warner-Blankenship

(57) ABSTRACT

A system and method for removably joining two surfaces together with a connector using protrusions and slots. A protrusion rising from the surface is slid into a slot in a parallel direction to the surface so it is secured against being removed in a perpendicular direction to the surface. Various shapes of protrusions and slots are possible, including trapezoid profiles.

9 Claims, 41 Drawing Sheets

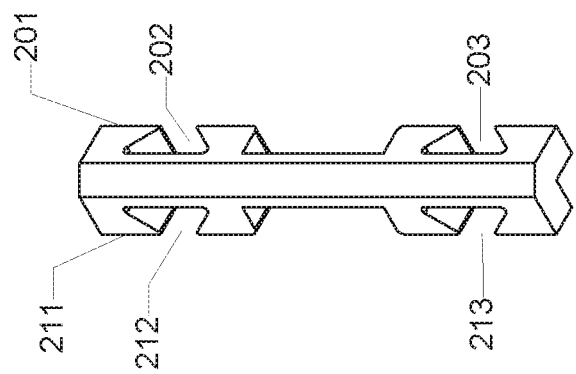

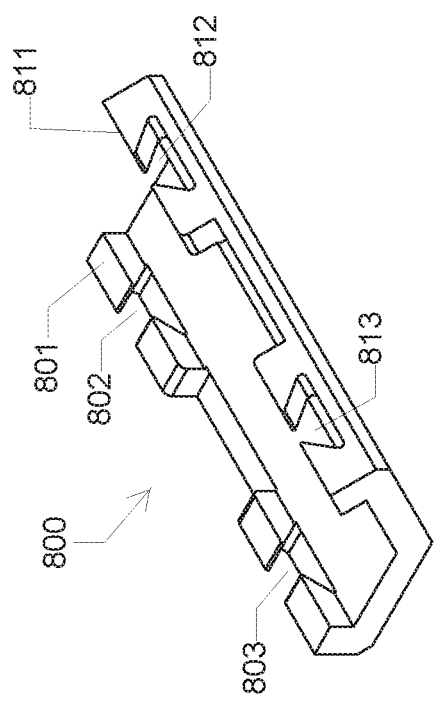

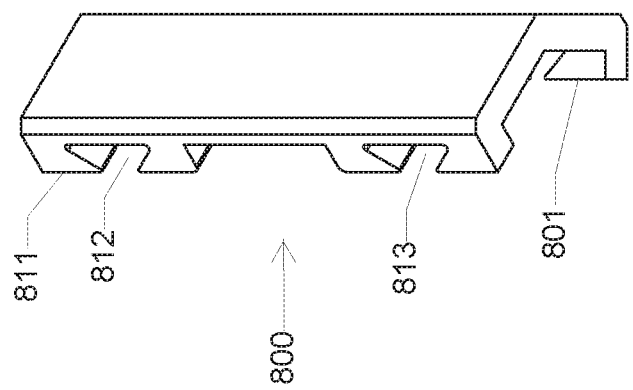

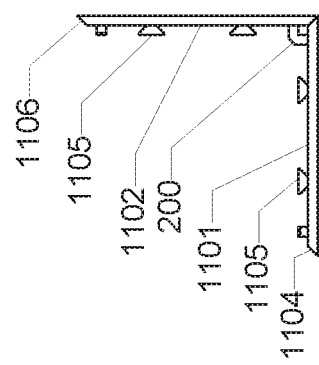

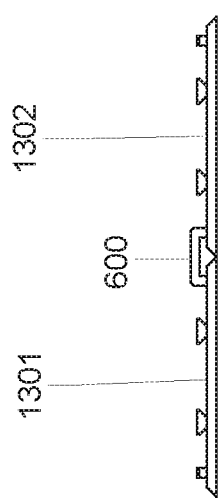

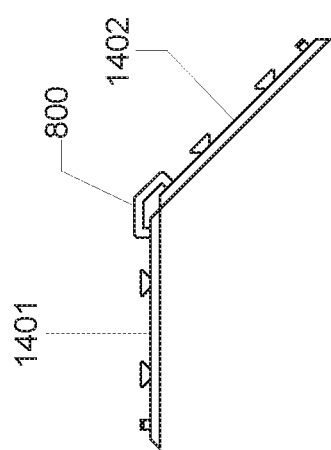

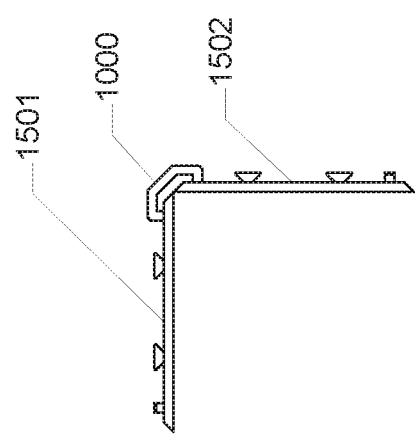

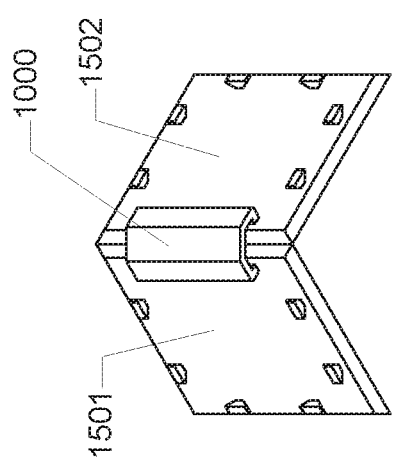

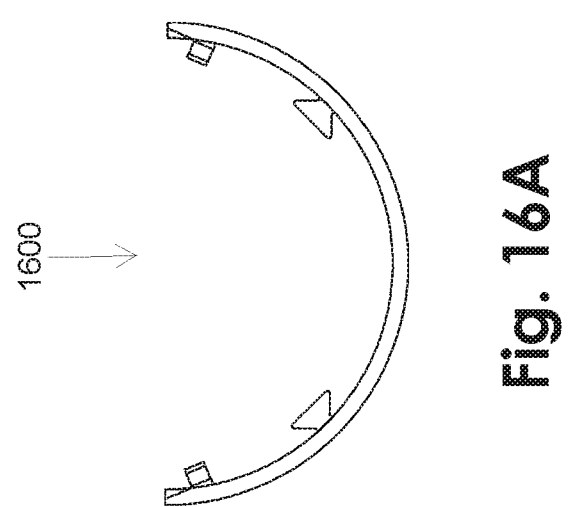

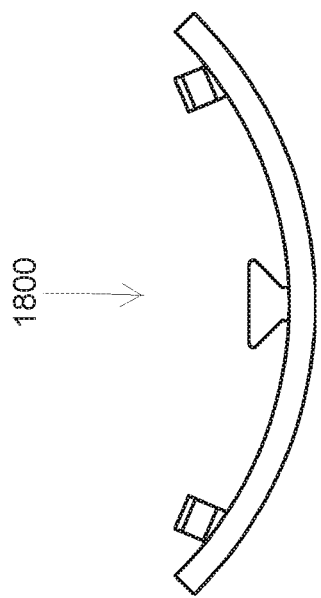

INTERLOCKING CONNECTOR AND ASSOCIATED SYSTEMS AND METHODS

FIELD

This disclosure relates generally to devices, systems and methods of removably joining two surfaces and more particularly to an interlocking connector for joining separate surfaces.

BACKGROUND

When constructing a structure, it is necessary to join and sometimes removably join separate surfaces together.

One problem encountered during the joining process is ease of removability. Adhesives, nails, and the like have been used to join separate surfaces together for centuries, but they are not easy to remove and often leaves undesired residue or holes once removed.

Another problem encountered during the joining process is speed of construction. Adhesives take a long time to dry, and sometimes require a vice grip while drying in order to ensure adequate strength.

Yet another problem encountered during the joining process is steadfastness. Interconnecting joints such as a tongue and groove joint is strong but allows two surfaces to slide and bend.

Each of these systems or methods have some disadvantages which limit its usefulness. Therefore, there is a continued need for a system which preserves ease of removability while still being easy to use.

SUMMARY OF THE INVENTION

The present invention overcomes the above-described problems of the prior art by providing a system for removably joining two surfaces with a connector, with a surface having one or more trapezoid profile protrusions with the longest edge of the protrusion furthest away from the surface. A connector with trapezoid profile slots slidably interlocks with the trapezoid profile protrusion rising from the surface by sliding into the slot in a direction parallel to the surface. A second surface having one or more trapezoid profile protrusions is similarly jointed to the connector.

In one aspect, the present invention provides a first surface having one or more trapezoid profile protrusions rising from the first surface with the longest edge of the protrusion furthest away from the first surface. A second surface having one or more trapezoid profile protrusions rising from the second surface with the longest edge of the protrusion furthest away from the second surface is also provided. A connector having a first side and a second side, the first side having at least one trapezoid profile slot slidably interlocking with the trapezoid profile protrusion rising from the first surface, and the second side having at least one trapezoid profile slot slidably interlocking with the trapezoid profile protrusion rising from the second surface joins the two surfaces together.

In a preferred aspect, the protrusions has an isosceles trapezoid profile.

In yet another preferred aspect, the connector has a raised edge adjacent to the slot for keeping the protrusion in the slot when joined.

In yet another preferred aspect, the surface has an angled or tapered edge for minimizing gaps with a corresponding angled or tapered edge on the second surface when joined.

In yet another preferred aspect, the angled or tapered edges on the surfaces are 45 degrees.

In one aspect, the present invention provides a method of removably joining a first surface having at least one trapezoid profile protrusion and a second surface having at least one trapezoid profile protrusion with a connector having at least two trapezoid profile slots, where the protrusion on the first surface is aligned with the first slot such that the protrusion and the slot are adjacent to each other. The protrusion on the first surface is then slid into the first slot in a direction parallel to the first surface. The protrusion on the second surface is aligned with the second slot such that the protrusion and the slot are adjacent to each other, and then the protrusion on the second surface is slid into the second slot in a direction parallel to the second surface.

In a preferred aspect, the connector has a raised edge adjacent to the second slot and the sliding of the protrusion stops at the raised edge.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 1b is another perspective view of the example connector of FIG. 1a;
FIG. 2b is another perspective view of the example connector of FIG. 2a;
FIG. 3b is another perspective view of the example connector of FIG. 3a;
FIG. 4b is another perspective view of the example connector of FIG. 4a;
FIG. 5b is another perspective view of the example connector of FIG. 5a;
FIG. 6b is another perspective view of the example connector of FIG. 6a;
FIG. 7b is another perspective view of the example connector of FIG. 7a;
FIG. 8a is a perspective view of an example connector;
FIG. 8b is another perspective view of the example connector of FIG. 8a;
FIG. 9b is another perspective view of the example connector of FIG. 9a;
FIG. 11a side view of the example connector of FIG. 2a connecting two surfaces.

FIG. 13a side view of the example connector of FIG. 6a connecting two surfaces;

FIG. 14a side view of the example connector of FIG. 8a connecting two surfaces;

FIG. 15a side view of the example connector of FIG. 10a connecting two surfaces;

FIG. 15b is a perspective view of the example connector of FIG. 10a connecting two surfaces;

FIG. 16a is a side view of an example curved surface;

FIG. 18a is a side view of an example curved surface;

FIG. 18b is a perspective view of the curved surface of FIG. 18a;

FIG. 20b is a side view of the example surface of FIG. 20a.

DETAILED DESCRIPTION OF EMBODIMENTS

The following discussion of the embodiments of the invention directed to a interlocking connector is merely exemplary in nature, and is in no way intended to limit the invention or its applications or uses. For example, the embodiments discussed below are described in the context of an interlocking connector on surfaces. However, the disclosed fastener system is also suitable for use in any other application where one surface is needed to be removably joined to another surface by a connector—such as building construction, machinery construction, construction of cars, planes, houses, boats, trains, toys, models, etc.

Figure 1A:
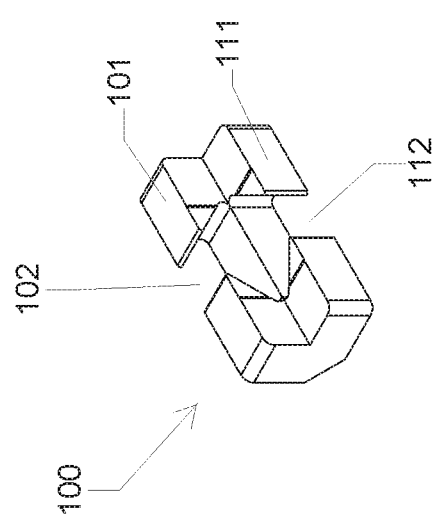
FIG. 1a is a perspective view of an example connector.
Figure 1B:
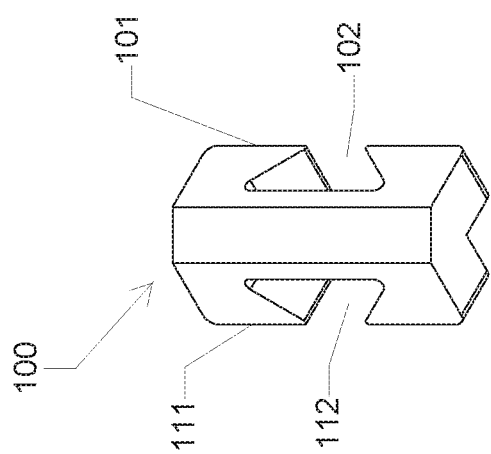

FIG. 1a is a perspective view of an example connector 100 with a first side 101 and a side surface 111 roughly angled 90 degrees from the first surface 101. Side 101 contains a slot 102 and side 111 contains a slot 112. FIG. 1b is another perspective view of the same connector 100 showing slots 102 and slot 112. While the slots are both shown as having an isosceles trapezoid profile, it should be noted that being isosceles is not essential, and that each of the slots may be shaped differently from the other and other profile shapes may be used.

Figure 2A:
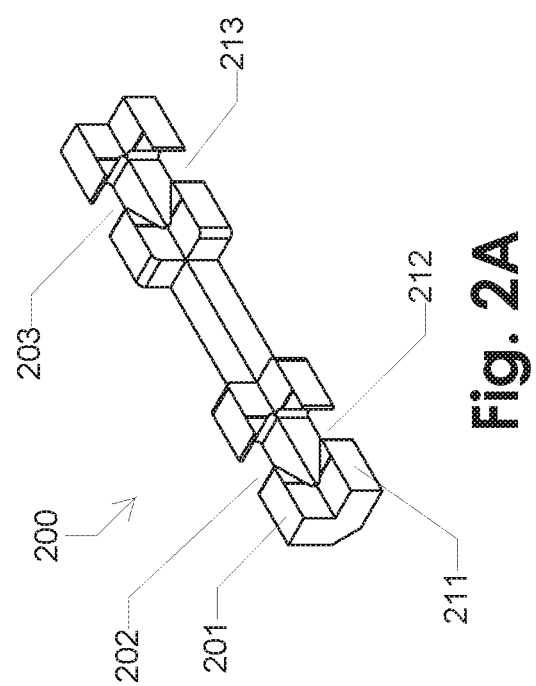
FIG. 2a is a perspective view of an example connector.
Figure 2C:
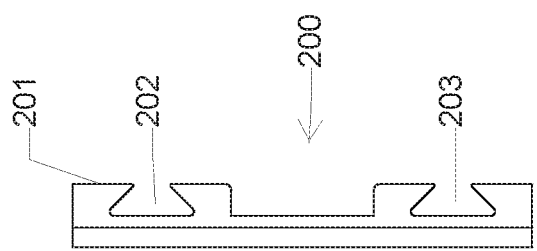
FIG. 2c is yet another perspective view of the example connector of FIG. 2a and FIG. 2b.

FIG. 2a is a perspective view of an example connector 200 with a first side 201 and a second side 211 roughly angled 90 degrees from the first side 201. Side 201 contains two slots—slot 202 and slot 203. Side 211 also contains two slots—slot 212 and slot 213. FIG. 2b is another perspective view of the same connector 200 from another angle, and FIG. 2c is another perspective view of the same connector 200 from yet another angle. Connector 200 is a longer alternative embodiment of connector 100, with more slots. In this way, a connector can be made in any required length having any required number of slots spaced throughout its length.

Figure 3A:
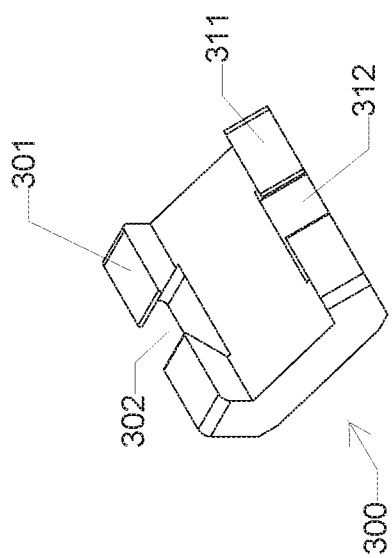
FIG. 3a is a perspective view of an example connector.
Figure 3B:
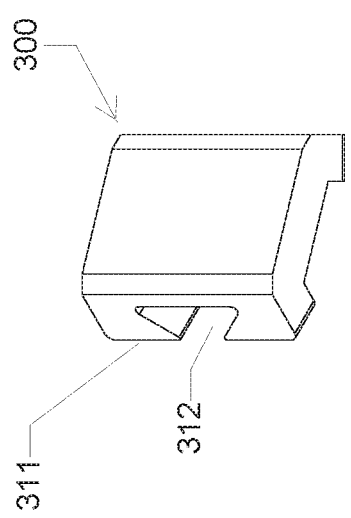

FIG. 3a is a perspective view of an example connector 300 with a first side 301 and a second side 311. Side 301 contains a slot 302 and side 311 contains a slot 312. FIG. 3b is another perspective view of the same connector 300 from another angle. First side 301 is spaced apart from the second side 311 and the two sides are angled roughly 45 degrees from each other.

Figure 4A:
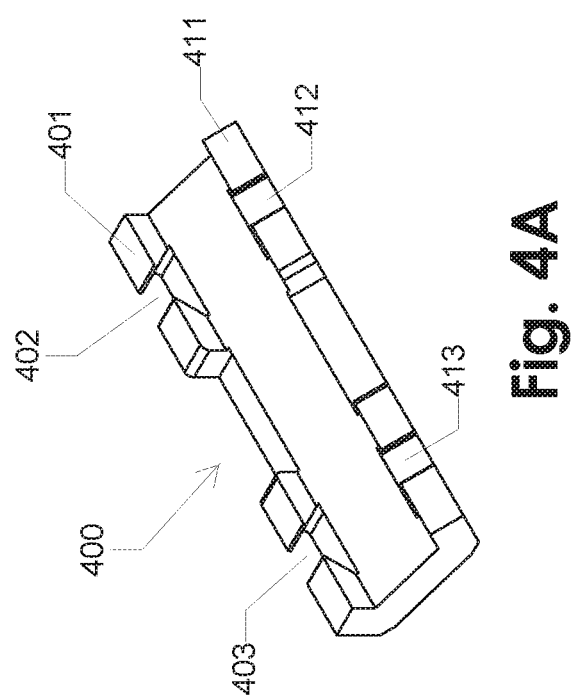
FIG. 4a is a perspective view of an example connector.
Figure 4B:
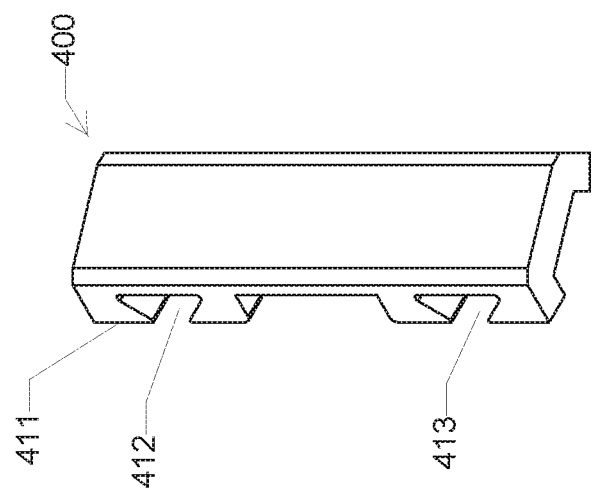
Figure 12A:
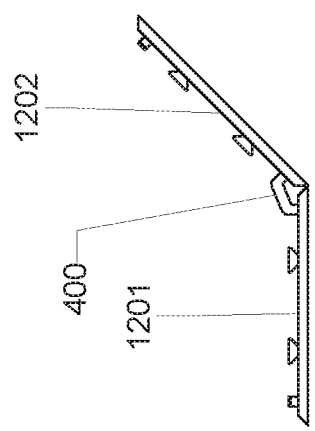
FIG. 12a side view of the example connector of FIG. 4a connecting two surfaces.
Figure 12B:
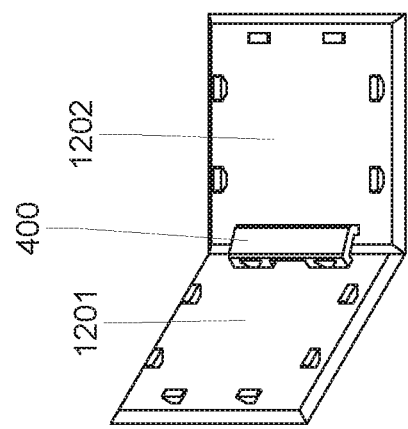
FIG. 12b is a perspective view of the example connector of FIG. 4a connecting two surfaces.

FIG. 4a is a perspective view of an example connector 400 with a first side 401 and a second side 411 roughly angled 45 degrees from the first side 401. Side 401 contains two slots—slot 402 and slot 403. Side 411 also contains two slots—slot 412 and slot 413. FIG. 4b is another perspective view of the same connector 400 from another angle. Connector 400 is a longer alternative embodiment of connector 300, with more slots. In this way, a connector can be made in any required length having any required number of slots spaced throughout its length. As seen in FIG. 12a and FIG. 12b, having the sides 401 and 411 spaced apart from each other allows the surface 1201 and surface 1202 to be angled roughly 135 degrees from each other with no gaps in between them when the surfaces are joined with the connector 400.

Figure 5A:
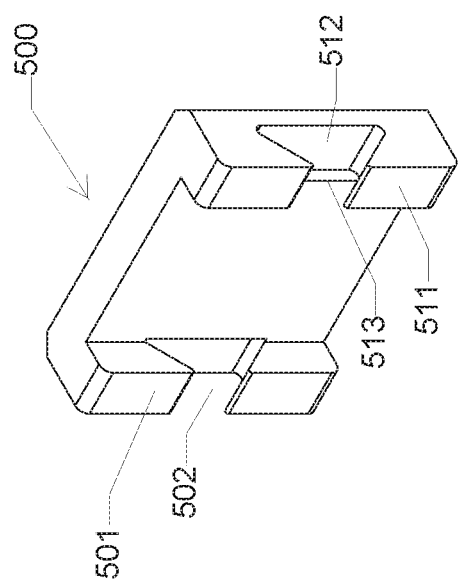
FIG. 5a is a perspective view of an example connector.

FIG. 5a is a perspective view of an example connector 500 with a first side 501 and a second side 511. First side 501 is spaced apart from the second side 511, and the two sides are angled in the same direction. Side 501 contains a slot 502 and side 511 contains a slot 511. Along side 511 there is a raised edge 513, and along side 501 there is another raised edge that is not shown. While raised edge 513 is shown running the entire length of connector 500, that is not essential. Raised edge 513 can be shortened as desired, and may even be as short or small as a raised dot adjacent to slot 512. As will be shown elsewhere in this application, raised edge 513 helps keep protrusions that are slid into slot 512 within the slot.

Figure 5B:
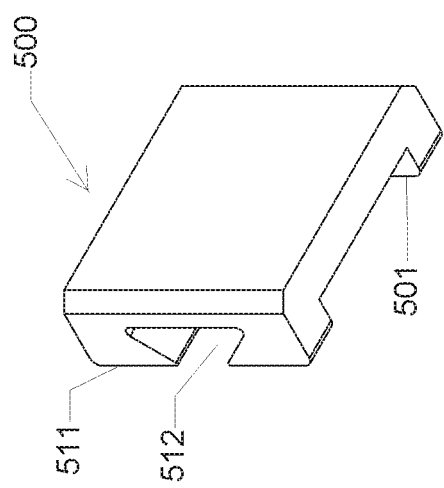

FIG. 5b is another perspective view of the same connector 500 from another angle.

Figure 6A:
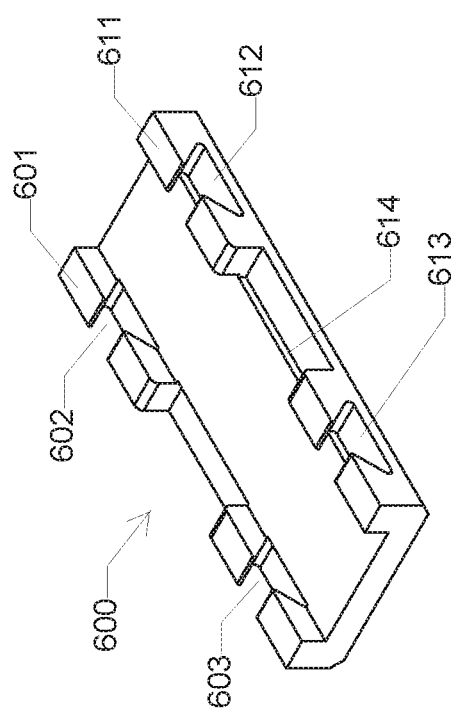
FIG. 6a is a perspective view of an example connector.

FIG. 6a is a perspective view of an example connector 600 with a first side 601 and a second side 611 angled in the same direction as side 601. Side 601 contains two slots—slot 602 and slot 603. Side 611 also contains two slots—slot 612 and slot 613. Along side 611 there is a raised edge 614, and along side 601 there is another raised edge that is not shown. While raised edge 614 is shown running the entire length of connector 600, that is not essential. Raised edge 614 can be shortened as desired, and may even be as short or small as one or more raised dots adjacent to slots 612 and slot 613 respectively. As will be shown elsewhere in this application, raised edge 614 helps keep protrusions that are slid into slot 612 or 613 within the slot.

Figure 6B:
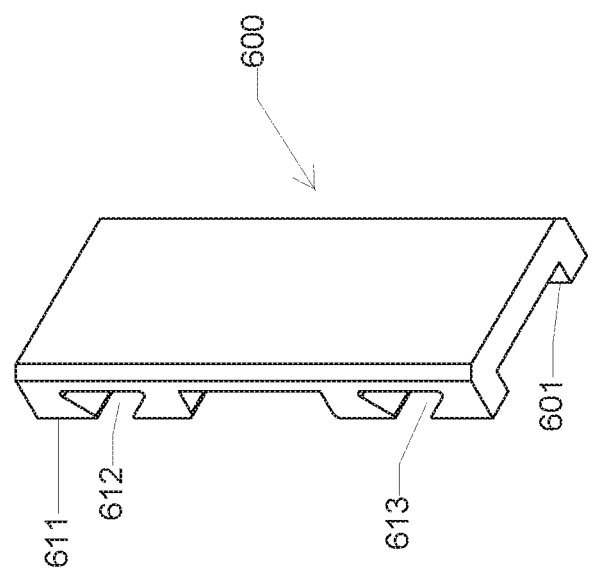
Figure 13B:
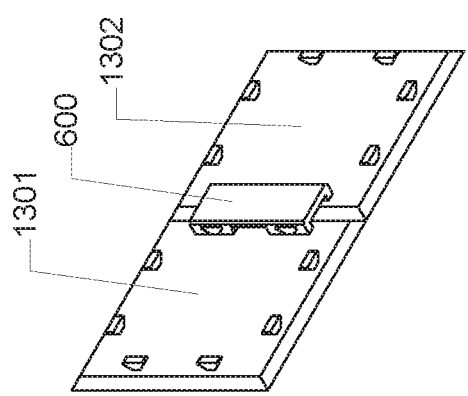
FIG. 13b is a perspective view of the example connector of FIG. 6a connecting two surfaces.

FIG. 6b is another perspective view of the same connector 600 from another angle. Connector 600 is a longer alternative embodiment of connector 500, with more slots. In this way, a connector can be made in any required length having any required number of slots spaced throughout its length. As seen in FIG. 13a and FIG. 13b, having the sides 601 and 611 spaced apart from each other allows the surface 1301 and surface 1302 to be connected to each other securely with no gaps in between them when the surfaces are joined with the connector 600.

Figure 7A:
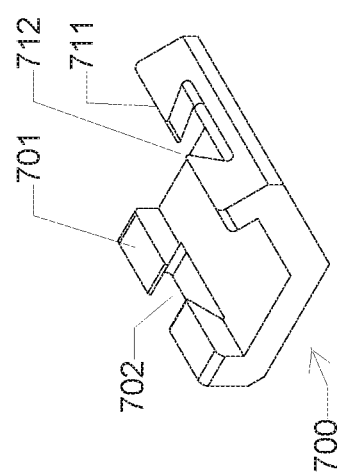
FIG. 7a is a perspective view of an example connector.
Figure 7B:
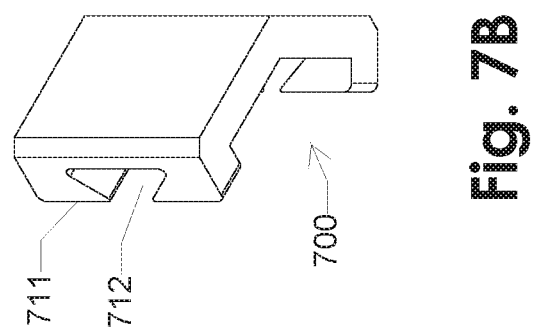
Figure 7C:
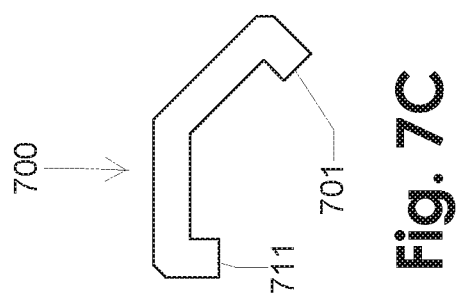
FIG. 7c is yet another perspective view of the example connector of FIG. 7a and FIG. 7b.

FIG. 7a is a perspective view of an example connector 700 with a first side 701 and a second side 711. Side 701 contains a slot 702 and side 711 contains a slot 712. FIG. 7b is another perspective view of the same connector 700 from another angle. First side 701 is spaced apart from the second side 711 and the two sides are angled roughly −45 degrees from each other. Unlike FIG. 3*a* for example, side 701 and side 711 are angled in the opposite direction. FIG. 7*c* is another perspective view of the same connector 700 which better shows the angle between side 701 and side 711.

Figure 14B:
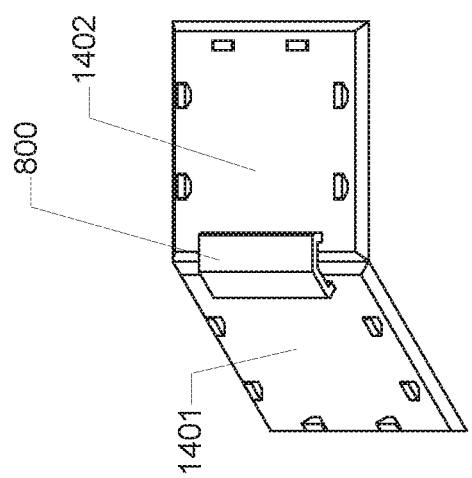
FIG. 14b is a perspective view of the example connector of FIG. 8a connecting two surfaces.

FIG. 8*a* is a perspective view of an example connector 800 with a first side 801 and a second side 811 roughly angled −45 degrees from the first side 801. Unlike FIG. 4*b* for example, the sides 801 and 811 are angled in the opposite direction. Side 801 contains two slots—slot 802 and slot 803. Side 811 also contains two slots—slot 812 and slot 813. FIG. 8*b* is another perspective view of the same connector 800 from another angle. Connector 800 is a longer alternative embodiment of connector 700, with more slots. In this way, a connector can be made in any required length having any required number of slots spaced throughout its length. As seen in FIG. 14*a* and FIG. 14*b*, having the sides 801 and 811 spaced apart from each other allows the surface 1401 and surface 1402 to be angled roughly 225 degrees from each other with no gaps in between them when the surfaces are joined with the connector 800.

Figure 9A:
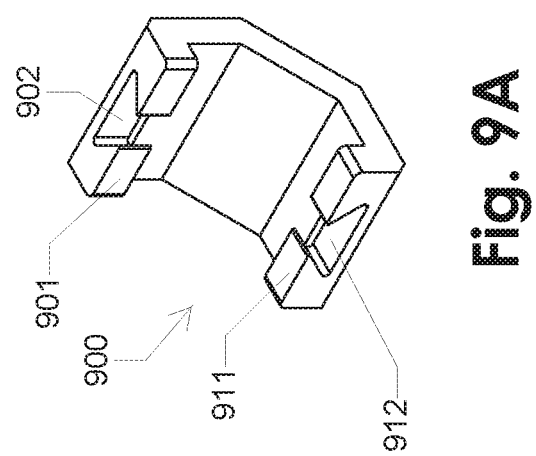
FIG. 9a is a perspective view of an example connector.
Figure 9B:
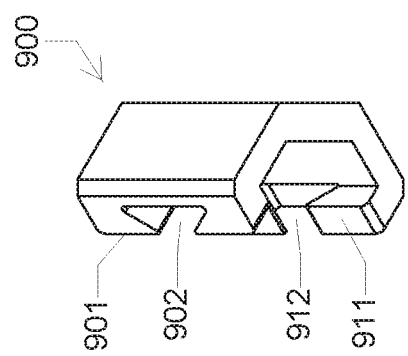
Figure 9C:
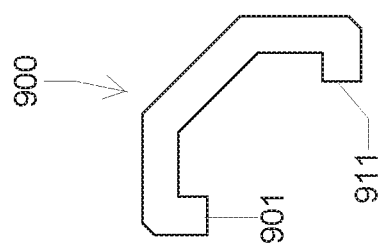
FIG. 9c is yet another perspective view of the example connector of FIG. 9a and FIG. 9b.

FIG. 9*a* is a perspective view of an example connector 900 with a first side 901 and a second side 911. Side 901 contains a slot 902 and side 911 contains a slot 912. FIG. 9*b* is another perspective view of the same connector 900 from another angle. First side 901 is spaced apart from the second side 911 and the two sides are angled roughly −90 degrees from each other. Unlike FIG. 1*a* for example, side 901 and side 911 are angled in the opposite direction. FIG. 9*c* is another perspective view of the same connector 900 which better shows the angle between side 901 and side 911.

Figure 10A:
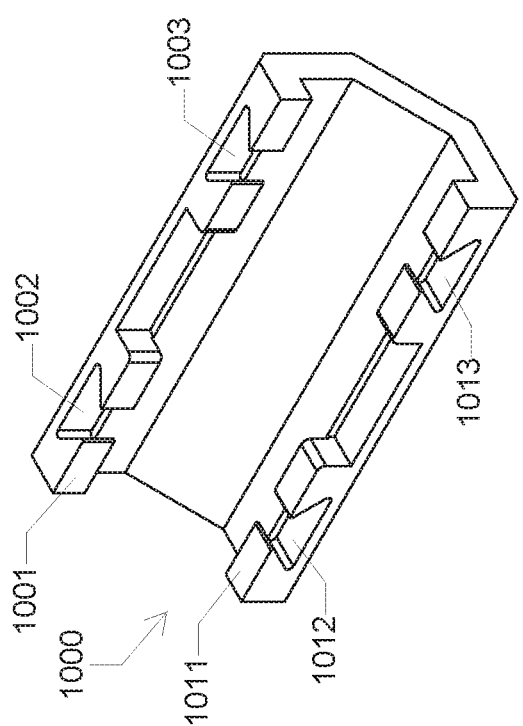
FIG. 10a is a perspective view of an example connector.

FIG. 10*a* is a perspective view of an example connector 1000 with a first side 1001 and a second side 1011 roughly angled −90 degrees from the first side 1001. Unlike FIG. 1*b* for example, the sides 1001 and 1011 are angled in the opposite direction. Side 1001 contains two slots—slot 1002 and slot 1003. Side 1011 also contains two slots—slot 1012 and slot 1013. Connector 1000 is a longer alternative embodiment of connector 900, with more slots. In this way, a connector can be made in any required length having any required number of slots spaced throughout its length. As seen in FIG. 15*a* and FIG. 15*b*, having the sides 1001 and 1011 spaced apart from each other allows the surface 1501 and surface 1502 to be angled roughly 270 degrees from each other with no gaps in between them when the surfaces are joined with the connector 1000.

Figure 11B:
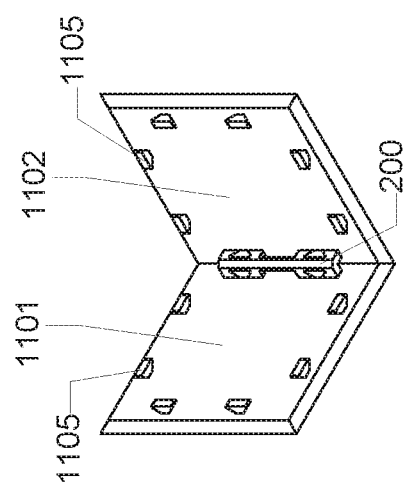
FIG. 11b is a perspective view of the example connector of FIG. 2a connecting two surfaces.

FIG. 11*a* is a side view of a first surface 1101 and a second surface 1102, both having a number of protrusions 1105 for interlocking engagement with slots on connector 200. FIG. 11*b* is a perspective view of the same first surface 1101 and second surface 1102. Connector 200 connects the first surface 1101 and second surface 1102 at a 90 degree angle to each other.

First surface 1101 features an angled or tapered edge 1104 and second surface 1102 features a taped edge 1106 around their respective edges. This taper allows the surfaces to be connected by connector 200 in such a way that any gap between the surfaces at the connecting edge is minimized.

FIG. 12*a* is a side view of a first surface 1201 and a second surface 1202, both having a number of protrusions for interlocking engagement with slots on connector 400. FIG. 12*b* is a perspective view of the same first surface 1201 and second surface 1202. Connector 400 connects the first surface 1201 and second surface 1202 at a 45 degree angle to each other.

FIG. 13*a* is a side view of a first surface 1301 and a second surface 1302, both having a number of protrusions for interlocking engagement with slots on connector 600. FIG. 13*b* is a perspective view of the same first surface 1301 and second surface 1302. Connector 600 connects the first surface 1301 and second surface 1302 at a 180 degree angle to each other.

FIG. 14*a* is a side view of a first surface 1401 and a second surface 1402, both having a number of protrusions for interlocking engagement with slots on connector 800. FIG. 14*b* is a perspective view of the same first surface 1401 and second surface 1402. Connector 800 connects the first surface 1401 and second surface 1402 at a 225 degree angle to each other.

FIG. 15*a* is a side view of a first surface 1501 and a second surface 1502, both having a number of protrusions for interlocking engagement with slots on connector 1000. FIG. 15*b* is a perspective view of the same first surface 1501 and second surface 1502. Connector 1000 connects the first surface 1501 and second surface 1502 at a 270 degree angle to each other.

Figure 17A:
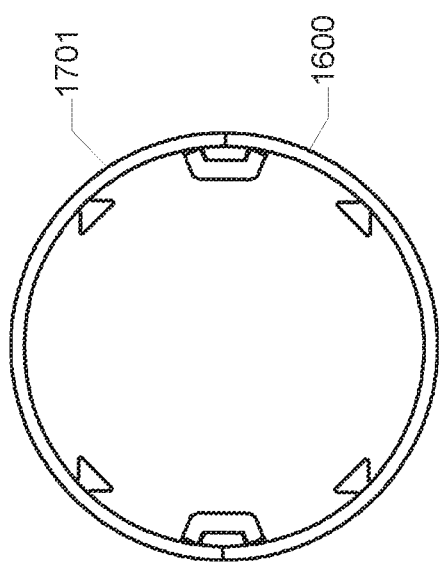
FIG. 17a is a side view of two curved surfaces of FIG. 16a connected by connectors.
Figure 17B:
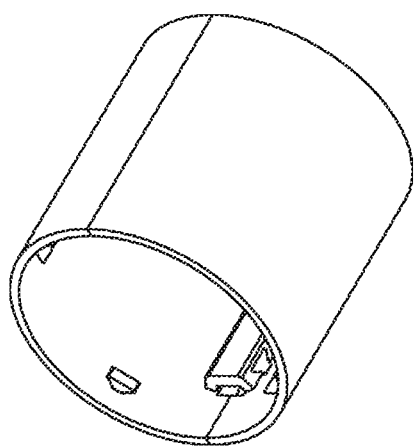
FIG. 17b is a perspective view of two curved surfaces of FIG. 16a connected by connectors.

While all previous example surfaces were flat, they do not necessarily have to be so. FIG. 16*a* is a side view of a curved surface 1600 having a number of protrusions which could be connected in a similar manner. FIG. 17*a* shows the same curved surface 1600 connected to a second curved surface 1701. FIG. 17*b* is a perspective view of a curved surface connected to another curved surface with connectors.

Figure 18B:
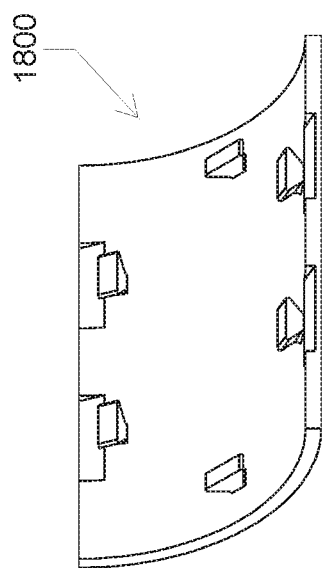
Figure 19A:
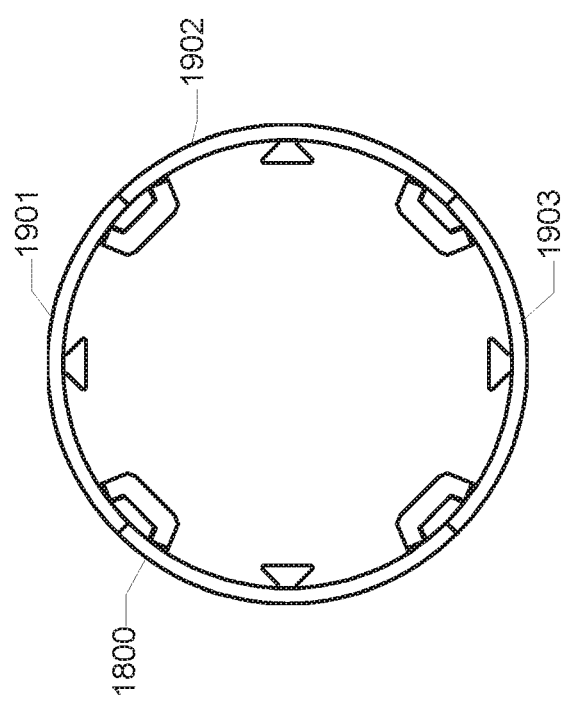
FIG. 19a is a side view of four curved surfaces of FIG. 18a connected by connectors.
Figure 19B:
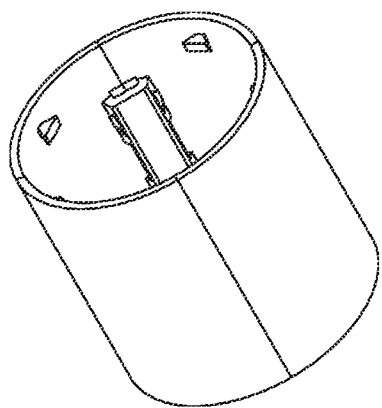
FIG. 19b is a perspective view of four curved surfaces of FIG. 18a connected by connectors.

FIG. 18*a* is a side view of a curved surface 1800 having a number of protrusions which could be connected in a similar manner. Curved surface 1800 has a different curvature than curved surface 1600, and it should be noted that any curvature, including concave and convex curvatures, or any combination of concavity and convexity, are also possible. FIG. 19*a* shows the same curved surface 1800 connected to three other curved surfaces 1901, 1902, and 1903. FIG. 17*b* is a perspective view of all four curved surfaces connected to each other with connectors.

Figure 20A:
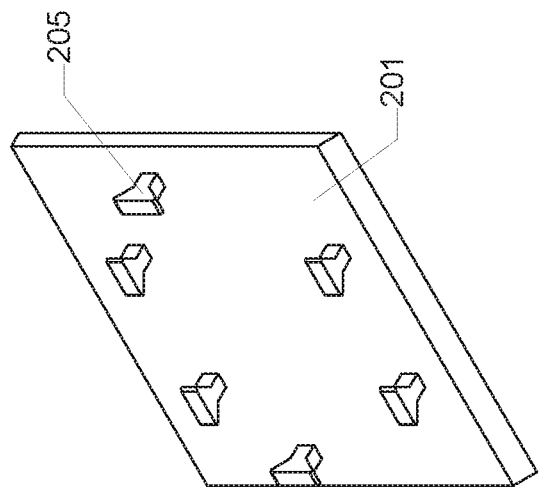
FIG. 20a is a perspective view of an example surface with raised protrusions.
Figure 20B:
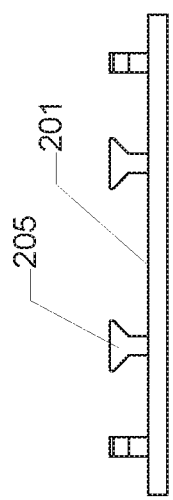

The protrusions and slots shown so far are isosceles trapezoid in profile with the longest edge of the protrusion furthest away from the surface, but it should be noted that other shapes can be used as long as the protrusion and the slot are shaped so that once the protrusion is slid into the slot in a direction parallel to the surface, it can resist being pulled perpendicular from the surface. For instance, the protrusion may be non-isosceles trapezoid in profile, a circle, a triangle, or even a raised isosceles trapezoid profile such as protrusion 205 in FIG. 20*a* and FIG. 20*b*. A raised isosceles trapezoid profile such as protrusion 205 allows the use of surfaces with non-tapered edges while still minimizing any gap between surfaces at the connecting edge.

Referring back to FIG. 11*a*, FIG. 11*b*, FIG. 2*a* and FIG. 2*b*, a first surface 1101 is aligned with a connector 200 so that at least one protrusion 1105 is aligned with a slot 202. Once aligned, the protrusion is slid into the slot in a direction parallel to surface 1101. The shape of the protrusion and the slot ensure that the connector 200 is secured against being removed in a perpendicular direction from surface 1101. The second surface 1102 is then similarly aligned with the connector 200 so that at least one protrusion 1105 rising from second surface 1102 is aligned with a slot 212. Once aligned, the protrusion is slid into the slot in a direction parallel to surface 1102. The shape of the protrusion and the slot ensure that the connector 200 is secured against being removed in a perpendicular direction from surface 1102. In this way, surface 1101 and surface 1102 are joined with each other via the connector.

To remove, protrusion 1105 from surface 1101 is slid in a direction parallel to surface 1101 so that the protrusion is no longer within slot 212 and surface 1101 is no longer connected to connector 200. Similarly, surface 1102 is slid in a direction parallel to surface 1102 so that its protrusion is no longer within slot 202 and surface 1102 is no longer connected to connector 200.

Referring back to FIG. 6*a*, connector 600 features a raised edge 614 adjacent to slot 612 and slot 613 that helps keep protrusions that are slid into slot 612 or 613 within the slot. Referring to FIG. 13*a* and FIG. 13*b*, a first surface 1301 has a number of protrusions for sliding into respective slots on connector 600. Because of the flat nature of connector 600, a protrusion can easily overshoot its slot and come out the other side and become disengaged. Raised edge 614 ensures that when a protrusion is slid into a slot, once the protrusion hits the raised edge it is stopped and does not come out the other side to become disengaged.

Although the invention has been described in connection with certain preferred embodiments, it is not intended to be limited thereto. Rather, the invention includes all embodiments which may fall within the scope of the following claims.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for removably joining a first surface and a second surface with a connector, the system comprising:
   the first surface having one or more trapezoid profile protrusions rising from the first surface with a longest edge of the protrusion furthest away from the first surface;
   the second surface having one or more trapezoid profile protrusions rising from the second surface with a longest edge of the protrusion furthest away from the second surface;
   the connector having a first side and a second side, the first side having at least one trapezoid profile slot for slidably interlocking with the trapezoid profile protrusion rising from the first surface, and the second side having at least one trapezoid profile slot opposite the other trapezoid profile slot for slidably interlocking with the trapezoid profile protrusion rising from the second surface,
   wherein the connector has a raised edge between the trapezoid profile slots, wherein the longest edge of each of the trapezoid profile protrusions of the first and second surfaces is substantially parallel to, and engages with, the raised edge to keep the protrusions in the respective slots when the first and second surfaces are joined by the connector.

2. The system of claim 1, wherein at least one of the protrusions has an isosceles trapezoid profile.

3. The system of claim 1, wherein the first surface has an angled edge for minimizing gaps with a corresponding angled edge on the second surface when joined.

4. The system of claim 3, wherein both angled edges are 45 degrees.

5. A method of removably joining a first surface having at least one trapezoid profile protrusion with a longest edge of the protrusion being furthest way from the first surface and a second surface having at least one trapezoid profile protrusion with a longest edge of the protrusion being furthest away from the second surface with a connector having at least two trapezoid profile slots on opposite sides of the connector, the connector having a raised edge between the two trapezoid profile slots, wherein the longest edge of each protrusion is substantially parallel to the raised edge, the method comprising:
   aligning the protrusion on the first surface with the first slot such that the protrusion and the slot are adjacent to each other;
   sliding the protrusion on the first surface into the first slot in a direction parallel to the first surface until the protrusion engages with the raised edge on a first side thereof;
   aligning the protrusion on the second surface with the second slot such that the protrusion and the slot are adjacent to each other; and
   sliding the protrusion on the second surface into the second slot in a direction parallel to the second surface until the protrusion engages with the raised edge on a second side thereof.

6. A system comprising:
   a first surface having one or more trapezoid profile protrusions rising from the first surface with a longest edge of the protrusion furthest away from the first surface;
   a second surface having one or more trapezoid profile protrusions rising from the second surface with a longest edge of the protrusion furthest away from the second surface; and
   a connector having a first side and a second side, the first side having at least one trapezoid profile slot for slidably interlocking with the trapezoid profile protrusion rising from the first surface, and the second side having at least one trapezoid profile slot opposite the other trapezoid profile slot for slidably interlocking with the trapezoid profile protrusion rising from the second surface,
   wherein the connector has a raised edge between the trapezoid profile slots, wherein the longest edge of each of the trapezoid profile protrusions of the first and second surfaces is substantially parallel to, and engages with, the raised edge to keep the protrusions in the respective slots when the first and second surfaces are joined by the connector.

7. The system of claim 6, wherein at least one of the protrusions has an isosceles trapezoid profile.

8. The system of claim 6, wherein the first surface has an angled edge for minimizing gaps with a corresponding angled edge on the second surface when joined.

9. The system of claim 8, wherein both angled edges are 45 degrees.

\* \* \* \* \*